UNITED STATES PATENT OFFICE.

AUGUST FRIEDRICH JULIUS SIGMUND HAAKE AND HEINRICH ADOLF ROBERT ARTHUR HAAKE, OF HAMBURG, GERMANY.

PROCESS OF PREPARING SOLUBLE STARCH.

No. 813,647. Specification of Letters Patent. Patented Feb. 27, 1906.

Application filed February 3, 1903. Serial No. 141,763.

*To all whom it may concern:*

Be it known that we, AUGUST FRIEDRICH JULIUS SIGMUND HAAKE and HEINRICH ADOLF ROBERT ARTHUR HAAKE, manufacturers, of 37 Eichenstrasse, in the city of Hamburg, Germany, have invented a Process of Preparing Soluble Starch; and we do hereby declare the nature of this invention and in what manner the same is to be performed to be particularly described and ascertained in and by the following statement.

This invention relates to a process of preparing soluble starch.

In order to convert ordinary starch into the soluble variety, it has hitherto been the custom to treat it with dilute acids, saline solutions, &c., and after conversion was complete it was of course necessary to let settle, decant off the clear liquor, and dry the starch, a process which is as inconvenient as it is expensive and involves a very bulky plant.

According to the process of the present invention the starch is not mixed with aqueous solutions, so that the operations of settling, decanting, and drying are altogether obviated, with a consequent considerable decrease in the working expenses, since the necessary plant is very much simplified.

This process consists, essentially, in mixing the starch with such substances as, in consequence of their great affinity for hydrogen, decompose the water contained in the starch by combining with the hydrogen and setting free the ogygen or such substances as themselves decompose on mixing with starch, whereby the oxygen contained in them is set free. In all cases the nascent oxygen oxidizes the starch, and the desired dry product suitable for the preparation of adhesives is obtained, which when dissolved in boiling water gives not a paste, but a gummy solution.

The method of carrying out the process is as follows: One hundred kilograms of starch is intimately mixed with six kilograms of hypochlorite of lime. Ordinary starch contains about twenty per cent. of water. The chlorin combines with the hydrogen contained in the water, forming hydric chlorid, and the oxygen set free effects *in statu nascendi* the oxidation of the starch particles. The action of the hypochlorite of lime may be increased by the addition of sodium bicarbonate. The proportions used are one hundred kilograms of starch, seven kilograms of calcium chlorate, and one kilogram of sodium-hydrogen carbonate. When these substances are intimately mixed, the carbon dioxid contained in the sodium bicarbonate combines with the lime of the hypochlorite of lime to form calcium carbonate. The chlorin set free by this reaction combines with the hydrogen of the combined water in the starch, which is consequently decomposed, the nascent oxygen at once oxidizing the starch. In both cases the resulting product is vendable without further treatment. Since no water is added during the process, no drying treatment is necessary, and consequently no drying plant is required in order to drive off this water. In order to prepare the product for use, it is only necessary to stir the product obtained as above described with water and then boil it.

Having now particularly described and ascertained the nature of the said invention and in what manner the same is to be performed, we declare that what we claim is—

1. The herein-described process of preparing a soluble starch consisting in mixing common starch in what is commonly termed its "dry" state in which about twenty per cent. of water is contained therein with dry hypochlorite of lime, substantially as described.

2. The herein-described process of preparing a soluble starch consisting in mixing common starch and hypochlorite of lime with sodium-hydrogen carbonate, all to be mixed in a dry condition, the dryness of the starch being that commonly referred to when the starch contains approximately about twenty per cent. of water substantially as described.

In witness whereof we have hereunto set our hands in presence of two witnesses.

AUGUST FRIEDRICH JULIUS SIGMUND HAAKE.
HEINRICH ADOLF ROBERT ARTHUR HAAKE.

Witnesses:
ALFRED JOSEPH,
JULIUS WALTER HAAKE.